United States Patent [19]
Sato

[11] Patent Number: 5,015,104
[45] Date of Patent: May 14, 1991

[54] SHAFT BEARING STRUCTURE
[75] Inventor: Hiroyuki Sato, Tokyo, Japan
[73] Assignee: Seikosha Co., Ltd., Tokyo, Japan
[21] Appl. No.: 416,895
[22] Filed: Oct. 4, 1989
[30] Foreign Application Priority Data
Oct. 20, 1988 [JP] Japan .................. 63-136904[U]
[51] Int. Cl.$^5$ .............. F16H 55/18; F16C 27/00; F16C 33/02
[52] U.S. Cl. ................... 384/296; 74/409; 384/218; 384/271; 384/428
[58] Field of Search .......... 384/276, 906, 428, 271, 384/246, 295, 296, 218, 192; 74/409

[56] References Cited
U.S. PATENT DOCUMENTS

| 3,114,322 | 12/1963 | Leonard, Jr. | 384/271 X |
| 3,195,466 | 7/1965 | Young | 384/271 X |
| 3,874,752 | 4/1975 | Imazaike | 384/296 |
| 4,017,127 | 4/1977 | Smith et al. | 384/295 X |
| 4,077,680 | 3/1978 | Ashauer et al. | 384/218 |
| 4,498,790 | 12/1985 | Fisher | 384/906 X |
| 4,637,741 | 1/1987 | Gillet | 384/428 |
| 4,669,327 | 6/1987 | Aratsu | 74/409 |
| 4,671,129 | 6/1987 | Lovrenich | 74/409 X |
| 4,771,654 | 9/1988 | Shinjo et al. | 74/409 X |

Primary Examiner—Daniel P. Stodola
Assistant Examiner—William G. Battista, Jr.
Attorney, Agent, or Firm—Jordan and Hamburg

[57] ABSTRACT

A shaft bearing structure comprises a shaft which is to be rotatably supported, a bushing disposed on the shaft, the bushing having an outer surface tapered in an axial direction so as to have a frusto-conical configuration, a support member having a support opening for receiving the bushing, the support opening having an inner surface tapered in an axial direction so as to have a frusto-conical configuration, and a biasing member on the shaft biasingly urging the bushing in an axial direction such that the tapered outer surface of the bushing is biased into mating contact with the tapered inner surface of the support opening.

4 Claims, 1 Drawing Sheet

SHAFT BEARING STRUCTURE

BACKGROUND OF THE INVENTION

In conventional shaft bearing structures for rotatably supporting a rotating shaft, the rotating shaft is rotatably fitted in a bushing, and the bushing is fitted in a hole formed in a supporting member. Specifically, both the inner surface of the hole of the supporting member and the outer surface of the bushing are made in the form of a circumferential surface so that they tightly contact each other.

Where a bearing structure is to be constructed by tightly fitting a bushing in a hole with each having a circumferential surface as described above, a high machining accuracy is required for machining the hole and the bushing. If some play is present in the fitting of both components, the rotating shaft will not be accurately supported and held at the desired position. Therefore, in the case of a printer wherein the rotating shaft of a platen and the guide shaft of a print head are to be rotatably supported, both shafts will not have the desired parallelism or they will be unstable such that high quality printing cannot be attained.

It is an object of the present invention to provide a shaft bearing structure in which a hole and a bushing can be tightly fitted with each other without the need for high machining accuracy.

SUMMARY OF THE INVENTION

To achieve the foregoing object, a shaft bearing structure according to the present invention comprises a bushing in which a rotating shaft is fitted and a supporting member formed with a hole in which the bushing is to be fitted, and these are arranged such that the outer surface of the bushing is tapered in the axial direction thereof and the inner surface of the hole is tapered so as to contact the outer surface of the bushing. The rotating shaft is provided with a biasing member for urging the bushing in a direction in which the outer surface of the bushing comes into contact with the inner surface of the hole.

In addition, the bushing and the supporting member are provided with a restricting means which restricts the rotation of the bushing when they come into engagement with each other.

DESCRIPTION OF THE PREFERRED EMBODIMENTS

An embodiment of the present invention will now be described with reference to the drawings.

Figure 1:
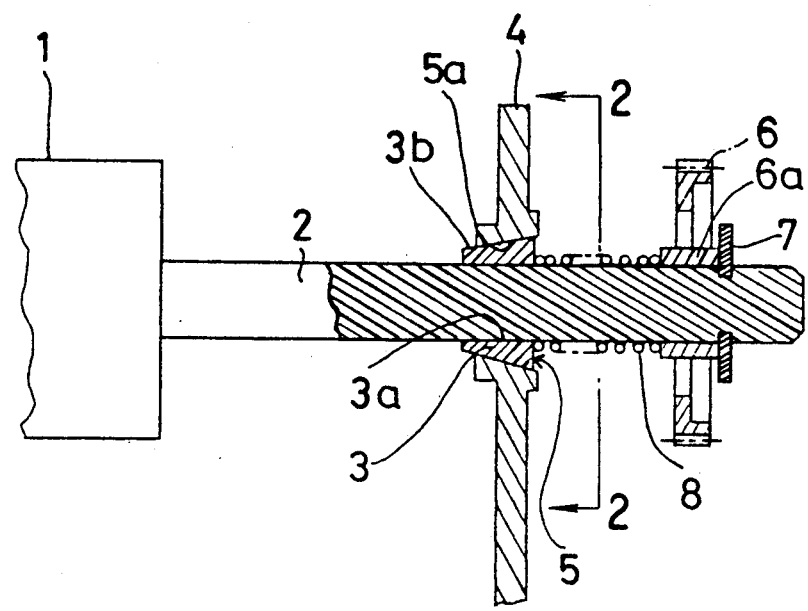
FIG. 1 is a front view, partly in cross section, of a shaft bearing structure according to one embodiment of the present invention.

As shown in FIG. 1, a rotating shaft 2 of a platen 1 is supported by a bushing 3 and a supporting member 4. The rotating shaft 2 is rotatably fitted in a bearing hole 3a in the bushing 3. The outer surface 3b of the bushing 3 is tapered into a conical shape, and in the illustrated embodiment, the small diameter end is disposed on the side of the platen. The supporting member 4 has a hole 5 in which the bushing 3 is fitted, the inner surface 5a of this hole 5 being tapered so as to mate and contact the tapered outer surface 3b of the bushing 3. In the illustrated embodiment, the larger diameter end is disposed on the outside surface of the supporting member 4 and the smaller diameter end is disposed on the inside surface thereof.

A portion of the rotating shaft 2 projecting through the supporting member 4 has a gear 6 mounted thereon non-rotatably relatively to the shaft 2. The position of the gear 6 in the axial direction is defined by an E-shaped retainer 7. A coil spring 8, acting as a biasing means, is interposed in a compressed state between a boss portion 6a of the gear 6 and the bushing 3. The coil spring 8 urges the bushing 3 such that the tapered outer surface 3b of the bushing 3 comes into contact with the tapered surface 5a of the hole 5.

Figure 2:
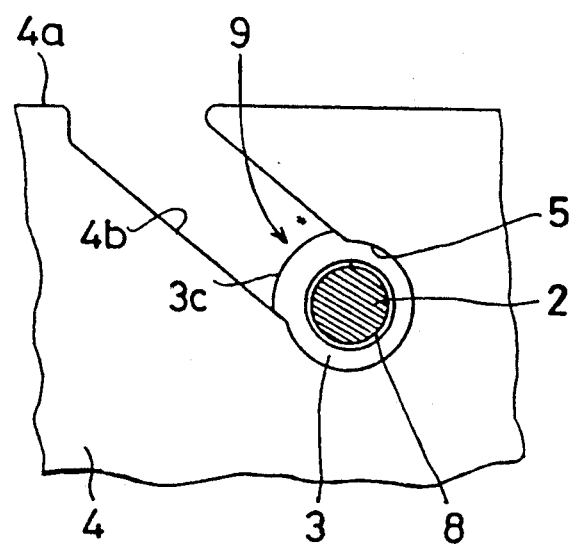
FIG. 2 is a sectional view taken along line 2—2 in FIG. 1.

FIG. 2 shows the outside surface of the bearing section in which the supporting member 4 has an inclined slot 4b leading from its upper end surface 4a to the hole 5 so that the rotating shaft 2 can reach the hole 5 through the slot 4b. The bushing 3 has a protrusion 3c engageable with the slot 4b. When the bushing 3 is held in a tightly fitted state between the rotating shaft 2 and the hole 5 by the urging force of the biasing member 8, the protrusion 3c engages the slot 4b to prevent rotation of the bushing 3, that is, the protrusion 3c and the slot 4b comprise a restricting means 9 for restricting the rotation of the bushing 3.

Because of the foregoing structure, when the rotating shaft 2 is to be supported by the supporting member 4, the bushing 3 is shifted rightward in FIG. 1 in opposition to the urging force of the biasing member 8, and the rotating shaft 2 is passed through the slot 4b and positioned inside the hole 5. Then, the bushing 3 is released and as a result, the bushing 3 passes into the hole 5 by the urging force of the biasing member 8 so that the tapered surface 3b and the tapered surface 5a tightly contact each other, whereby the assembly of the rotating shaft 2 is completed. At the same time, the protrusion 3c and the slot 4b are engaged with each other such that rotation of the bushing 3 is prevented. Since the gear 6 is applied with a load in an antirotational direction by the biasing member 8, the gear 6 is prevented from causing backlash.

According to the foregoing shaft bearing structure of the present invention, since the tapered outer surface of the bushing tightly contacts the tapered inner surface of the hole, a very tight contact state can be obtained without the need for high machining accuracy, no backlash occurs, and the rotating shaft can be stably supported.

What I claim is:

1. A shaft bearing structure comprising a rotatable shaft, a bushing disposed on said shaft, said bushing having an outer surface tapered in an axial direction so as to have a frusto-conical configuration, a support member having a support opening for receiving said bushing, said support opening having an inner surface tapered in an axial direction so as to have a frusto-conical configuration, a gear wheel mounted on said shaft to preclude relative rotation between said gear wheel and said shaft, a retainer means mounted on said shaft to preclude axial movement of said gear wheel on said shaft, and a biasing means disposed between said gear wheel and said bushing biasingly urging said bushing in an axial direction such that said tapered outer surface of said bushing is biased into mating contact with said tapered inner surface of said support opening, said biasing means applying a frictional load between said gear wheel and said retainer means so as to prevent backlash of said gear wheel, said support member having a slot leading to said support opening, said bushing having a protrusion extending outwardly of said tapered outer surface, said protrusion extending outwardly of said tapered outer surface, said protrusion being disposed in said slot to thereby prevent said bushing from rotating in said support opening.

2. A shaft bearing structure according to claim 1, wherein said support member has an outer edge, said slot extending from said outer edge to said support opening, said shaft being slidable along said slot to effect assembly of said shaft into said support opening.

3. A shaft bearing structure according to claim 1, wherein said bushing is axially slidably mounted on said shaft for movement to a displaced position displaced from said support member such that when in said displaced position, said shaft is slidable along said slot to said support opening and subsequently said bushing is slid axially along said shaft into assembled position in mating contact with said tapered support opening in said support member.

4. A shaft bearing structure comprising a shaft which is to be rotatably supported, a bushing disposed on said shaft, said bushing having an outer surface tapered in an axial direction so as to have a frusto-conical configuration, a support member having a support opening for receiving said bushing, said support member having a slot leading to said support opening, said bushing having a protrusion extending outwardly of said tapered outer surfce, said protrusion being disposed in said slot to thereby prevent said bushing from rotating in said support opening, said support opening having an inner surface tapered in an axial direction so as to have a frusto-conical configuration, said bushing being axially slidably mounted on said shaft for movement to a displaced position displaced from said support member such that when in said displaced position, said shaft is slidable along said slot to said support opening and subsequently said bushing is slid axially along said shaft into assembled position in mating contact with said tapered support opening in said support member, and biasing means said shaft biasingly urging said bushing in an axial direction such that said tapered outer surface of said bushing is biased into mating contact with said tapered inner surface of said support opening.

* * * * *